Nov. 17, 1942.　　　G. F. WOLFE ET AL　　　2,302,085
SPEED CONTROLLING MECHANISM
Filed Aug. 9, 1939　　　5 Sheets-Sheet 1

INVENTORS
GEORGE F. WOLFE
STANLEY G. WETMORE
HARRY L. McPHERSON
by J. H. Weatherford
Atty.

Patented Nov. 17, 1942

2,302,085

UNITED STATES PATENT OFFICE 2,302,085

SPEED CONTROLLING MECHANISM

George F. Wolfe, Stanley G. Wetmore, and Harry
L. McPherson, Memphis, Tenn.

Application August 9, 1939, Serial No. 289,228

14 Claims. (Cl. 192—.01)

Our invention relates particularly to speed controlling mechanism for controlling the speed of a vehicle driven by an internal combustion engine by automatically increasing or decreasing the flow of fluid liquid fuel to the engine, the controlling means being operated by means driven from a moving part so as to maintain a substantially constant rate of travel of the vehicle regardless of changes in load or in the grade of the road travelled. It is to be understood however that we do not limit ourselves to the control of speed of motor vehicles, since features of the invention may be applied to the control of motors for other uses and in other relations, e. g., for use on tractors; lawn mowers and the like; for use on aeroplanes to prevent slowing down beyond stalling speed, the device then being governed of course by means such as an air-speed tube connection instead of a speedometer cable; for use on watercraft by the provision of suitable speed-responsive means; for use on Diesel powered mechanisms by attachment to the fuel injection pump instead of to the combustion valve; and for use on stationary power units for maintaining synchronization of a plurality of power units.

Conventionally the speed of a motor vehicle is regulated manually by means of a foot lever or a hand lever actuated by the operator to change the position of a valve in the fuel supply line through which a mixture of air and liquid fuel is supplied to the motor, though various other controlling means have been suggested. The use of a hand lever which may be adjusted from time to time, as in the Ford model T automobile, is unsatisfactory since uniform speed does not result. Such a lever may be set for a definite speed but changes in wind resistance and in grade of the road cause frequent changes of speed that can only be compensated by resetting the lever more frequently and more accurately than is practicable. More accurate control is had by a foot accelerator, but this requires constant attention of the driver and constant though variable muscular strain which becomes very tiring in time, and is uncomfortable by reason of cramping effect on the muscles.

We are aware of the fact that automobile controls have been proposed, but the means suggested have not been found practical, either because of too much complication of mechanism or because they set only an upper limit of speed, or because they are not sufficiently flexible to suit modern traffic conditions and modern vehicles or because they are controlled by the vehicle load instead of by the speed of the vehicle, or for other reasons that have prevented any general adoption of such controls. One of the most important reasons is probably the fact that such proposed controls do not permit ready and complete change from the automatic control such as is desirable in open country and which may maintain a substantially uniform speed of forty miles per hour, to a manual control entirely independent of the automatic control, as required for slow travel in cities and towns or for sudden acceleration to avoid an accident or to pass another vehicle, etc.

It is an object of the invention therefore to provide an automatic control for a vehicle which will be operated according to the speed of the vehicle itself by a moving part of the vehicle and regardless of the load or the terrain being travelled to increase the fuel feed if the vehicle speed falls below the speed for which the control is set, and to decrease the fuel feed if the speed of the vehicle rises beyond the set speed, all without affecting the power of the vehicle motor.

Another object is to provide convenient and readily accessible means whereby the set speed may be altered over a wide range without stopping the vehicle, either to raise or to lower the set speed.

Another object is to provide means for automatically decreasing the fuel feed and eliminating the automatic control upon actuation of either the clutch pedal or the brake pedal.

Another object is to provide means for instantly disengaging the automatic control upon actuation of the clutch or brake pedal.

Another object is to provide means for reducing the fuel flow, when the gearing is in neutral, to the flow desired for an idling speed of the motor.

Another object is to provide means whereby the driver can instantly take over control of the motor and operate it at any desired speed, independently of the automatic controlling means, yet need not exert pressure on the accelerator or even maintain contact of hand or foot therewith except at such times as the automatic control is to be superseded.

Another object is to save fuel; since overfeeding of fuel is eliminated when our automatic control is in operation; since the carburetor pump is not operated, as it is in the case of the foot feed each time the operator raises his foot or presses it down on the accelerator; and since a more even feed is maintained so that the driver does not use his foot brake so often. The even feed also reduces the wear and strain on the motor.

Another object is to shorten the time required for stopping a vehicle, since the driver need not transfer his foot from the accelerator to the brake pedal, and since his leg is not tired and cramped due to continuous operation of the accelerator. With our device he may even keep his foot on the brake pedal in heavy traffic so as to stop most quickly.

Another object is to provide means whereby starting is facilitated up a grade, since if the car is stopped on a grade with the motor running the fuel necessary for starting the car is instantly supplied when the driver releases the brake instead of being supplied only after he has transferred his foot to the accelerator and depressed it. This also provides for quicker getaway even when the car is standing on a level surface with the motor running, and prevents the car from rolling back on a grade between the release of the brake and the depression of the accelerator.

An important object of the invention is to provide means whereby the problem of maintaining members of military or naval organizations in predetermined formation is simplified, as for maintaining a formation of aeroplanes, tanks or watercraft, regardless of wind or waves, alterations in terrain, etc.

Other objects are to provide an improved automatic speed governor, as may be done by eliminating the means for overriding the automatic speed control; to provide a device that is simple and cheap in construction and easily installed on any car; to provide a device that can be packed in small space for shipment; to increase driving comfort by eliminating sore muscles and tired, hot feet, and to afford more ready control in traffic due to eliminating of movements from brake to accelerator and vice versa.

The means by which the foregoing and other objects are accomplished and the method of their accomplishment will readily be understood from the following specification on reference to the accompanying drawings, in which.

Referring now to the drawings in which the various parts are indicated by numerals:

20 is the engine block of a modern automobile of well known make. 21 is the clutch and fly wheel housing, and 22 the transmission gear case. 23 is the gear shift lever; 24 the clutch pedal, and 25 the clutch pedal arm. 26 is the brake pedal, and 27 the brake pedal arm. 28 is a fragmentary portion of the steering post. 29 is the carbureter, and 30 the carbureter manifold. 31 is the shaft of a butterfly valve 32 by which flow of gas and air from the carbureter to the engine is normally controlled. 35 is the foot or accelerator pedal, which pedal is connected by a rod 36 and suitable linkage to the butterfly valve shaft 31.

Figures 6, 7:
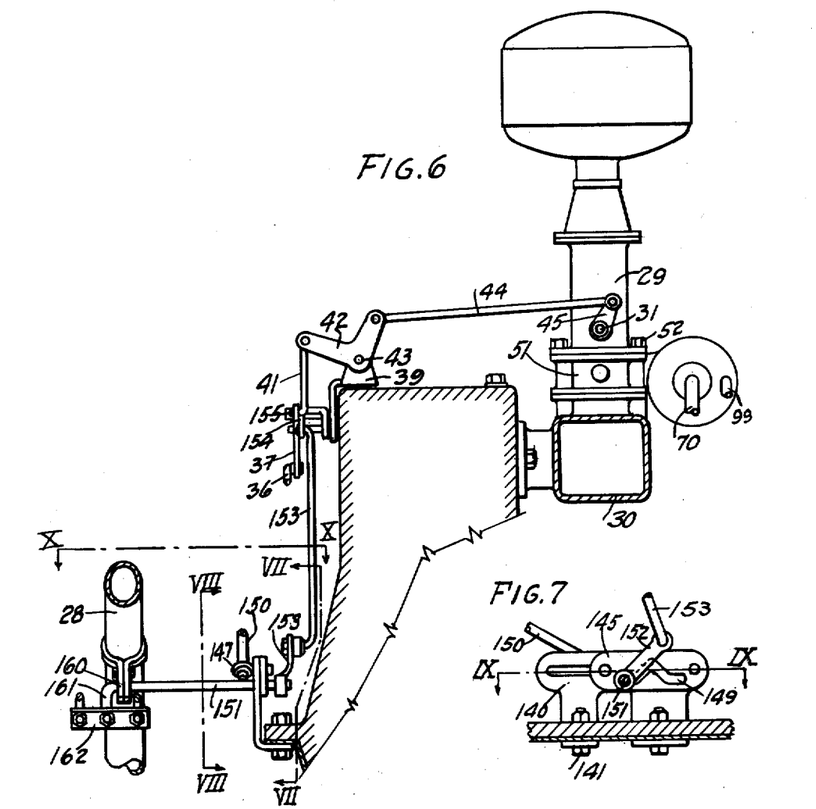
Fig. 6 is a transverse or end elevation with the engine block outlined in section, the view being taken as on the line VII—VII of Fig. 3.
Fig. 7 is a side elevation taken as on the line VII—VII of Fig. 6, showing the detail of the mechanism controlled by shifting gears.
Figure 8:
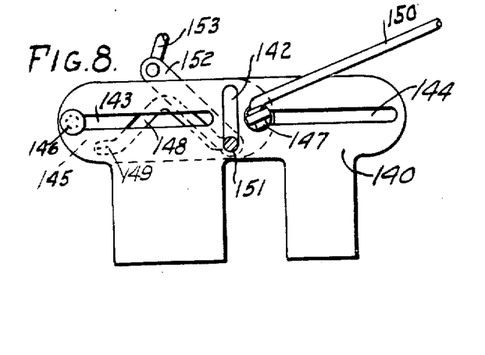
Fig. 8 (sheet 2) is a double scale elevation of the opposite side of the same mechanism, the view being taken as on the line VIII—VIII of Fig. 6.
Figure 9:
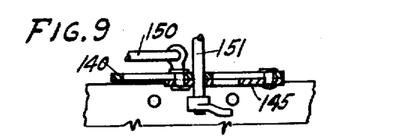
Fig. 9 is a horizontal section of the same mechanism taken on the line IX—IX of Fig. 7.
Figure 10:
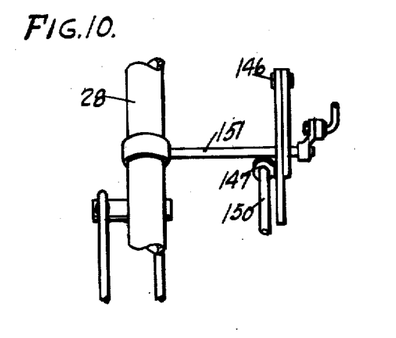
Fig. 10 a fragmentary plan view taken as on the line X—X of Fig. 6.

In the instant engine chosen for illustration, and ordinarily, the accelerator pedal lies to the left of the engine block facing forward in the car, being shown in this position in Fig. 6 of the drawings, and the carbureter is positioned to the right of the engine block. In this case the linkage connecting the accelerator rod 36 and the butterfly valve shaft 31 includes a bell crank lever 37 mounted on a pin 38 carried by a bracket 39 secured to the engine block as by cap screws 40. Bell crank lever 37 is connected by a link 41 with a second bell crank lever 42 mounted on a pin 43, also carried by the bracket 39, and this bell crank lever in turn is connected through a second link 44 with an arm 45 secured on the butterfly shaft 31. 46 is a tension spring opposing movement of the bell crank lever 37 and likewise opposing opening of the butterfly valve 32.

Figure 1:
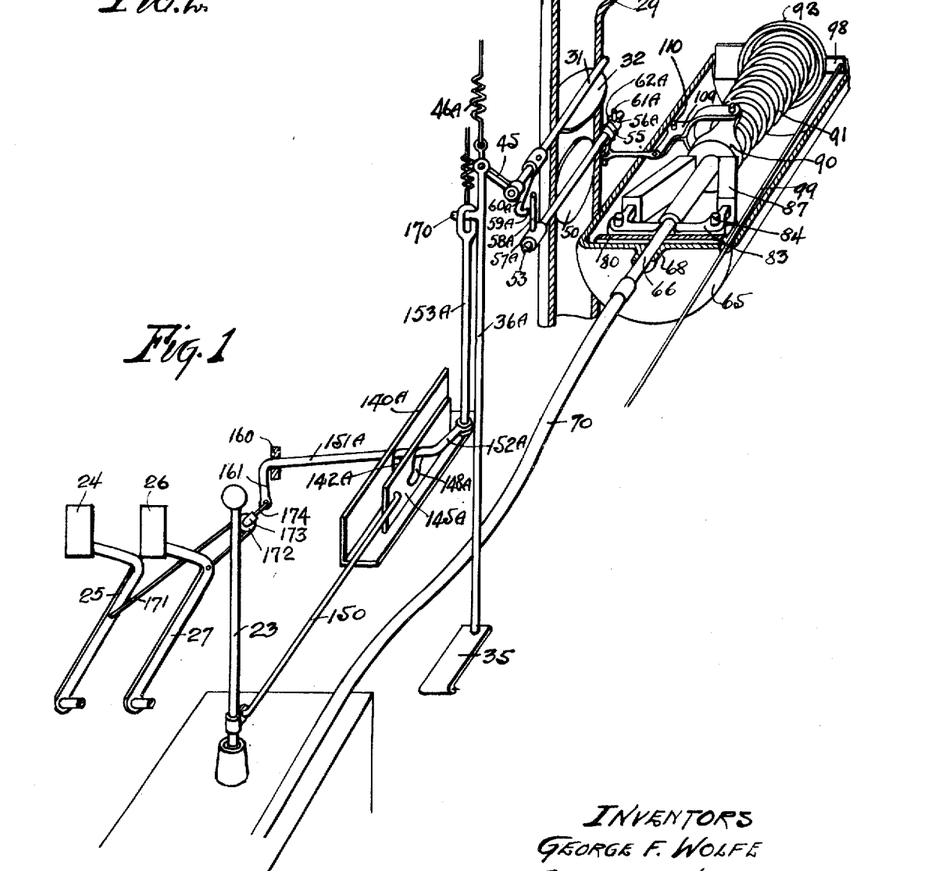
Fig. 1 is a diagrammatical view outlining the principles of action of the mechanism.
Figure 2:
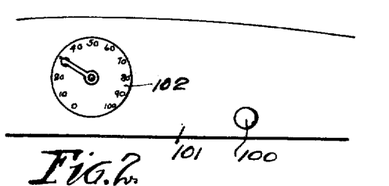
Fig. 2 is a fragmentary elevation showing the relative positions of the automobile speedometer and a button for adjusting the control speed.

In the diagrammatic view, Fig. 1, a rod 36—A is shown directly connecting the arm 45 on the butterfly valve with the foot pedal 35, the rod 36—A in this view accomplishing the connection from the accelerator pedal to the valve, which in the other views is accomplished by the rod 36 and the bell crank levers and links which the interference of other parts makes necessary in actual construction. As before, the opening of the valve is resisted by a tension spring 46—A, which spring, as does its equivalent 46, accomplishes the closing of the valve on release of the accelerator pedal 35.

Figure 3:
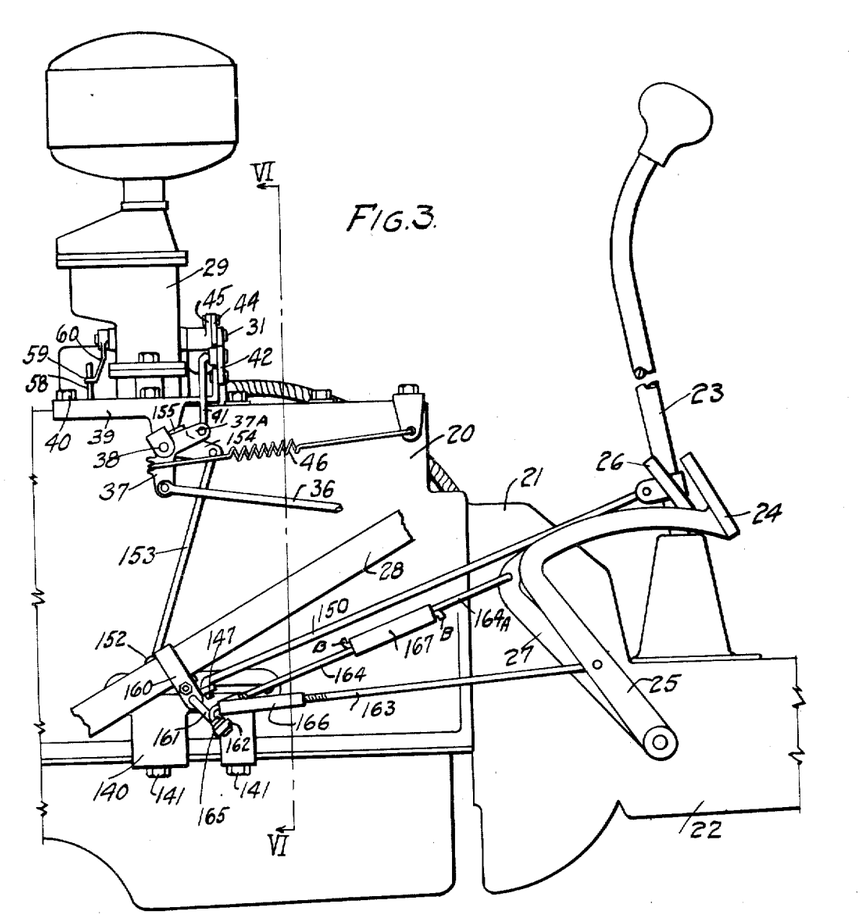
Fig. 3 is a side elevation of a portion of the engine block of an automobile and related parts showing the control device as actually applied thereto.
Figure 4:
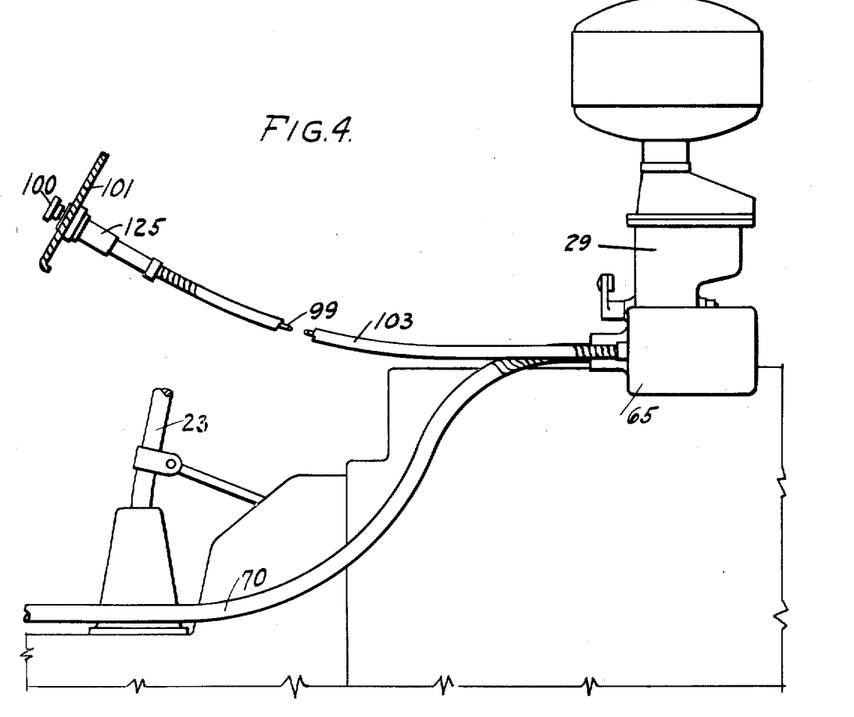
Fig. 4 is a similar side elevation showing the opposite side of the engine block.
Figures 11, 12, 13:
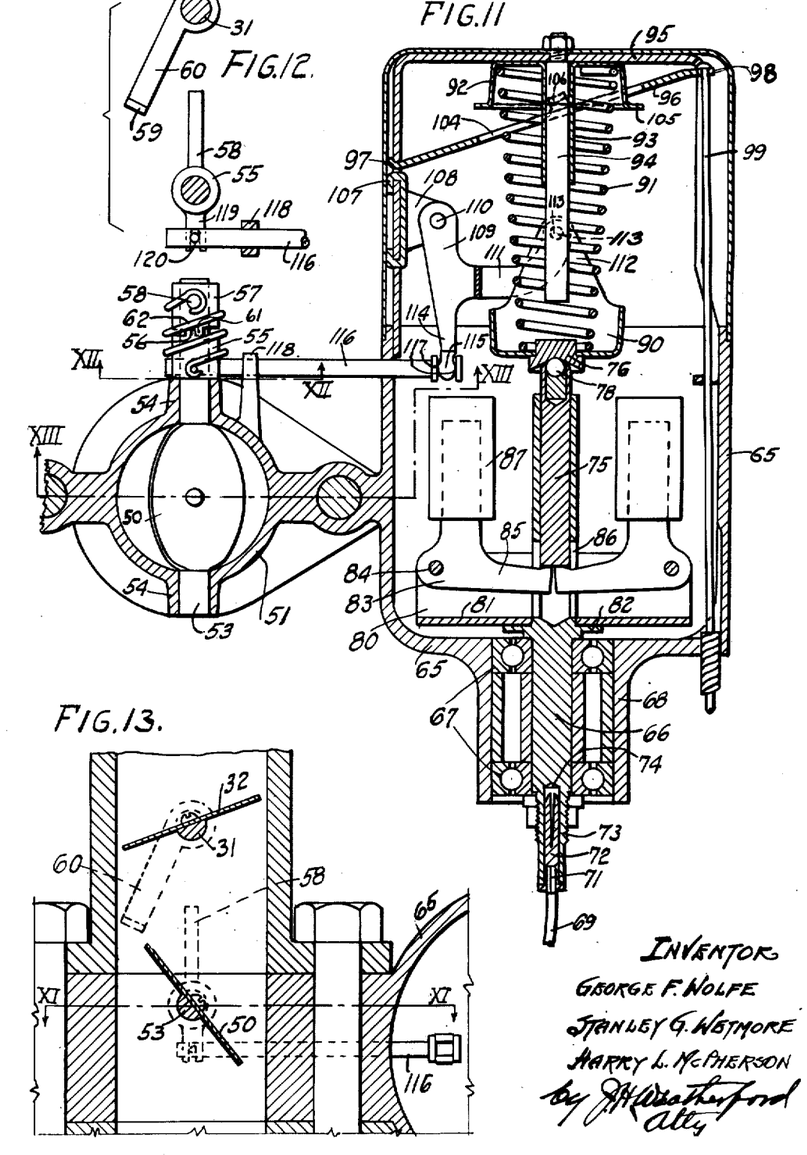
Fig. 11 is a horizontal section, substantially full size, of the governor effecting speed control.
Fig. 12 is a fragmentary vertical section taken on the line XII—XII of Fig. 11.
Fig. 13 a vertical section taken on the line XIII—XIII of Fig. 11.

In the preferred form of the present device a second butterfly valve 50 is inserted in the passageway which leads from the carbureter 29 to the manifold, this being done by inserting a short sleeve 51 under the carbureter 29, said sleeve providing a passageway in which the valve 50 is located. In effecting this insertion the original cap screws securing the carbureter 29 to the manifold 30 were removed and longer cap screws 52 used to secure both the carbureter and the inserted sleeve 51 to the manifold. The butterfly valve 50 is secured on a shaft 53 which is journalled in suitable bearings 54 forming part of the sleeve 51, which here are shown as plain bearings, but which obviously may be ball or roller bearings to reduce friction. Turnably mounted on the shaft 53 exterior to the bearings is a sleeve 55 which is provided with a lug 56. Also mounted on the shaft 53 is a second sleeve 57 which is rigidly secured to the shaft as by a pin 58, one end of this pin extending above the shaft (Figs. 3, 12 and 13) and into the path of a finger 59 of an arm 60, which arm is secured on the butterfly valve shaft 31 on the opposite side of the carbureter from the arm 45. The sleeve 57 is also provided with a lug 61 which is complementary to the lug 56 of sleeve 55, the two lugs being held normally in engagement by a light weight tension spring 62.

In the diagrammatic sketch of the device, 55 is, as before, the sleeve turnably mounted on the shaft 53, the sleeve being provided with a lug 56—A corresponding to the lug 56. 57—A is the second sleeve which is also mounted on the shaft 53 and secured thereto by the pin 58—A which extends into the path of the extension 59—A of the arm 60—A, these parts being substantially identical with the like numbered parts 57, etc., except that they are mounted on the opposite side of the passageway from the sleeve 55 to permit their clearer showing. In this view the lug 56—A is held against a pin 61—A extending from the shaft 53, this pin accomplishing the function of the lug 61 previously described, and the lug 56—A and 61—A being normally held in engagement by a spring 62—A.

65 is the casing of a governor which controls the opening and closing of the valve 50. This casing is rigidly secured to and supported by the sleeve 51 and encloses a stub shaft 66 which is mounted in suitable bearings in a hub 68 forming one end of the casing. This shaft, exterior to the casing, is joined to a flexible shaft 69 which extends to a connection with a speed responsive part of the automobile, being preferably enclosed in a flexible tube 70. It is here shown as extending toward the rear portion of the transmission case 22. It is preferably the substantial equivalent of the usual speedometer shaft of the automobile, and as a matter of fact, that shaft may be disconnected from the speedometer and directly used if it be so desired. In such case the speedometer is obviously abandoned unless a new speedometer drive is provided.

The shaft 66 may be provided with the usual square socket to receive a complementary square member 71 on the end of the shaft 69, but preferably it is counter-bored to receive a socket member 72 having therein a socket for the squared end 71 and having its end split into tongues 73 which frictionally engage the counter-bore 74 of the shaft. At its opposite end the shaft 66 is counter-bored to slidably receive a thrust pin 75, which pin is adapted to turnably seat against a socket member 76, this seating preferably being accomplished through an interposed ball 78.

The shaft 66 has mounted and secured thereon a transversely disposed channel shaped member 80, the web 81 of this member having an opening adapted to closely fit the shaft 66 and being disposed against and secured to a flange 82 integral with or integrally secured to the shaft 66 so that the channel 80 is constrained to turn with the shaft 66. Disposed between the legs of the channel 80 are bell crank levers 83 which are mounted on pivot pins 84. These bell crank levers have arms 85 which respectively extend through slots 86 into the counter-bore of the shaft 66 and into contact with the end of the thrust pin 75. On the opposite arms of the lever are the usual governor weights 87 which are adapted to move outward under centrifugal action.

The socket 76 is mounted in a shallow cup shaped member 90 which is adapted to receive one end of a compression spring 91, the opposite end of this spring being disposed in a somewhat similar, oppositely faced, cup shaped member 92. The member 92 has a tubular central guide portion 93 which is slidably mounted on a post 94 carried by a member 95 forming part of the housing 65 of the governor. Changes in the compression of the spring 91 are accomplished through a generally disc shaped member 96, which has at one side a protruding tongue 97 engaging a complementary opening in the member 95, and at its diametrically opposite side, a lug 98 to which is secured a flexible connector 99 which extends to a control mechanism and button 100, preferably mounted on the dash 101 of the car in accessible relation to the driver thereof and in close proximity to the speedometer 102 mounted on such dash. The connector 99 is mounted in a tube 103 which may be bent to effect any necessary change in direction between the governor and the position of the control on the dash. The disc member 96 has a central aperture 104 slightly larger than the external diameter of an outwardly extending annular flange 105, forming part of the cup member 92. On oppositely disposed sides of the opening 104 are lugs 106 which extend radially inward and engage opposite portions of the flange 105 so that shortening of the spring 91 may be accomplished by pull on the connector 99.

Also secured to the frame member 95, as by lugs 107, is a bracket 108 in which a bell crank lever 109 is mounted on a pivot pin 110. The bell crank lever 109 has a forked arm 111, the two prongs of which curve rapidly apart to lie outside of extensions 112 of the cup walls of the cup flange 90, the respective prongs being connected to the cup extensions 112 by pins 113. The second arm 114 of the bell crank lever 109 is provided with a fork 115 which engages opposite sides of a rod 116, between collars 117 on the rod. The rod 116 is positioned at right angles to the shaft line of the governor and extends outward and is slidable through a suitable opening in a side wall of the governor casing. It is also slidably mounted through a boss 118 carried by the sleeve 51 and extends beneath the sleeve 55. 119 is a forked arm integral with the sleeve 55 which engages a pin 120 which projects laterally from the rod 116, permitting movement of the rod responsive to governor action to rotate the sleeve and through the cooperating lugs 56 and 61 and the sleeve 57 to rotate the butterfly valve shaft 53 and the valve 50 carried thereby.

Figure 5:
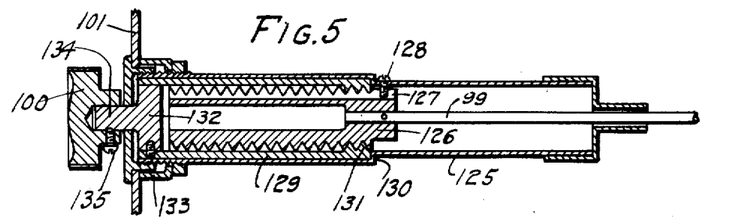
Fig. 5 is a sectional elevation of the mechanism for adjusting the control speed.

The connector 99 which extends from the governor to the control button 100 extends into a cylindrical case 125 (Fig. 5) and is secured to an elongated threaded head 126 adapted to slide longitudinally within the casing 125, this head having at one side a slot 127 which is engaged as by a pin 128 which prevents turning movement of the head. Disposed within the casing 125 is a cylindrical member 129 which is turnably mounted within the casing, but constrained at its inner end from longitudinal movement by an off-set or shoulder 130 in the casing 125. At this inner end, the member 129 is provided with internal threads 131 which engage the external threads on the member 126, and on turning of the member 129 advance or retract the head 126, the head being shown fully retracted in Fig. 5 by the action of the threaded member 129. The member 129 has at its outer end an internal plug 132 which may be an integral part of the member, but preferably is secured thereto as by a screw 133. The plug 132 has an extending shank portion 134 to which the button 100 is secured, as by a set screw 135. The casing 125 is rigidly secured, in any usual or desired manner, to the dash 101, or other supporting member.

A bracket 140 is secured as by screws 141 to the engine block 20. This bracket has a centrally disposed vertically extending slot 142 at its mid point and two horizontally disposed guide slots 143, 144 disposed symmetrically on opposite sides of the vertical slot 142. Disposed against one face of the slotted bracket is a slidable plate 145, this plate having pins 146, 147 which project respectively through the slots 143, 144 and slidably hold the plate against the bracket 140. The plate 145 is provided with an inverted V shaped slot 148, which slot has horizontal portions 149 extending outwardly from the ends of the legs of the V. The width of the vertical slot 142 in the bracket, and the height of the V is substantially the same, though not greater than the height of the slot 142. One of the pins extending from the plate 145, as the pin 147, is connected by a link 150 with a portion of the mechanism which accomplishes the shift of the transmission gears, being here shown as connected directly to the gear shift lever 23.

It will particularly be noted here that the length of the slots 143, 144 must be such as to permit shift of the lever to put the automobile gears into reverse or high or into second or low gear as the case may be, and that the spread of the V slot in the plate 145 must be such, and the positioning of this slot with relation to the pin 147 such, that when the automobile gears are in mesh one or the other of the horizontal portions 149 is alined with the vertical slot 142 in the bracket, and that when the gears are in neutral the apex of the inverted V is in line with the slot 142.

151 is a horizontally disposed rod, one end of which extends through the cooperating slots 142 and 148, this end of the rod having secured thereon a lever 152, which lever is connected by a link 153 with one arm of a bell crank lever 154, this bell crank lever being oscillatably mounted on the pin 38 and having a laterally extending lug 155 which overlies the arm 37—A of the bell crank lever 37 and operates this bell crank lever when the bell crank lever 154 is depressed, but has no effect to prevent independent operation of the lever. The opposite end of the rod 151 is loosely and turnably mounted in a bracket 160, here shown as clamped on the steering post 28. This latter end of the rod 151 is bent substantially at right angles to the rod, to form a lever arm 161, this arm being turned about 90 degrees from the lever arm 153 on the opposite end of the rod. Loosely and turnably secured on the end of the arm 161 is a bar 162, to the opposite ends of which rods 163, 164 are connected, these rods extending respectively to a connection with the clutch pedal arm 25 and the brake pedal arm 27. The connections of the rods 163 and 164 to the bar 162 are preferably made through ball and socket joints 165 to secure as nearly universal movements as is possible.

One or both of the rods, as the rod 163, preferably has a considerable length of thread at one end and is screwed into an elongated sleeve 166 through which adjustment of the length of the rod may be had, and this may also be true of the rod 164. The rod 164 preferably is made in two parts, 164 and 164—A, these two parts overlapping and being surrounded by a flattened sleeve 167 in which they are both free to slide and both rods having their end portions B outwardly turned to cooperate with the sleeve to limit separating movement.

It will be here noted that the connection of the rod 163 to the clutch pedal arm is much closer to the center of movement than is the connection of the rod 164 to the brake arm 27, this being done because of the much greater movement under ordinary use conditions of the clutch pedal than of the brake pedal. It will also be seen that the sliding joint in the brake pedal rod allows even travel movement of the brake pedal at such times as the brakes become loose or it otherwise happens there is more than normal movement of such pedal.

Although it is not here shown, it is well known that the clutch pedal and brake pedal are both retracted by springs, and it will be understood that the rods 163, 164 are merely, so far as their action is concerned, tension members connected to the bar 162 and arm 161. Also it will be understood that either the brake pedal or the clutch pedal may be used singly or that both may be used at the same time. When one of the pedals only is operated, as the clutch pedal, the link 164 from the brake pedal anchors one end of the bar 162 and permits movement of the other end to accomplish movement of the arm 161 and the converse is true when the brake pedal is operated.

In Fig. 1, 140—A indicates the bracket having a vertical slot 142—A, and 145—A indicates the complementary sliding plate having the V groove 148—A. In this view the plate has been separated from the bracket merely to permit the showing of the vertical slot in the bracket, and though it might operate with the shown separation, it is to be understood that the plate preferably slides against the bracket.

151—A is the rod extending through the slots 142—A and 148—A; 152—A the arm on the rod 151, and 153—A the link connecting the arm 152 to the valve linkage. In this view the upper end of the rod 153—A is slotted and engages over a pin 170 which projects from the link 36—A and forms a connection between the pedal mechanism and the accelerator mechanism, which as before permits independent action of the accelerator feed. The connection between the clutch arm 25, the brake arm 27, and the arm 161 is accomplished by a cord 171 which passes around a pulley 172 journalled in a yoke 173, the yoke being connected as by an additional cord 174 with the arm 161. The cord 171 is substantially the full equivalent of the two links 163 and 164, and the pulley 172 the equivalent of the bar 162 which equalizes the movement of the rods 163 and 164, either construction permitting movement of either brake pedal or clutch pedal to render the linkage ineffective to establish fuel flow.

It will be understood that the linkage necessary to connect the foot pedal and gear shift control with the fuel feed must vary largely with the type of engine in use and the position of the pedals and shift lever with relation to the carbureter or other fuel feed mechanism and that this also is true of the linkage necessary between the governor and the carbureter or other fuel feed parts.

It will therefore be distinctly understood that broad terms must, as far as possible, be used in the delineation, particularly of the linkage parts. It will also be understood that the present devices may readily be used to regulate fuel flow as to a Diesel type engine, although, for illustration, the carburetor type has here been shown.

It will be further understood that the governor introduced is merely a typical form of centrifugal governor which seems peculiarly adapted to the particular engine with which it is shown and is being used and that various modifications may be made in the type and detail of such a governor.

It will also be understood that while two valves have been shown that a single valve only may be used without departing from the spirit of our invention.

In installing the device the linkage and levers are so set that with the car in gear and both brake and clutch pedals in released position the linkage acting through the lug 155 on the fuel feed mechanism of the car holds the valve 32 in sufficiently open position to feed fuel to the engine to maintain a speed greater than any speed for which the governor may be set, and that for speeds in excess thereof the action of the foot accelerator must be depended on.

The valve 50 is set in substantially fully open position, and is moved from such position toward closed position by the governor as the car speed increases the governor controlled valve throttling the otherwise excessive flow through the fuel valve. It will thus be seen that a full flow of gas is furnished to build up or accelerate car speed and that regulation becomes effective only where the set speed is being reached, and that gently and smoothly and without sudden cut-off.

In operation, with the gears in neutral position, as is usual, the vehicle engine is started and allowed to idle. In starting, should the engine be sluggish or the weather be cold, additional fuel may be fed as by actuation of the accelerator pedal until the engine is started and thoroughly warmed up, there being no interference by the present mechanism with such starting or warming up of the engine, the position of the gear shift lever in neutral holding the arm 152—A (Fig. 1) in the position shown, wherein the spring 46—A holds the accelerator rod 36—A up so that the valve 32 is in substantially closed or idling position so far as the control mechanism is concerned, but in no way interfering with action of the foot accelerator.

To start the car, the gears are shifted in usual manner by depressing the clutch pedal and making use of the gear shift lever to put the gears into low gear. Actuation of the clutch pedal relieves the pull on the arm 161 and permits the rod 151—A adjacent the arm 152—A to be lowered without effecting pull through the arm 45 on the valve 32 which still remains closed, the arm 161 being free to swing as the rod is lowered, so that arm 152—A will not pull rod 153—A downward. After shift into gear the clutch pedal is released in usual manner to engage the clutch. This release, through the connector 171, turns the arm 161 and rod 151—A depressing the arm 152—A and through the linkage 153—A depresses the butterfly valve arm 45, and opens the butterfly valve 32, permitting fuel flow to build up the speed of the engine and effect movement of the car. When the car has reached the desired speed in low gear, the clutch pedal is again depressed in usual manner, shift is made to second gear and after the build-up of speed the final shift is made to high gear. During this action control of the fuel feed, as outlined above, is substantially entirely controlled by movement of the clutch pedal and shift lever.

With the car in high gear, speed is progressively further built up by substantially full fuel flow. As this build-up occurs however the governor, in response to the car speed acts on the butterfly valve 50 to slowly move the valve toward cut-off position. When the speed for which the governor is set is reached, the governor will have closed the valve to such an extent as to furnish just sufficient fuel to maintain the speed. Should the car momentarily exceed such speed, the governor cuts down the supply of fuel and reduces the speed, but until such speed is reached there is a constant build-up of the speed. The speedometer, also responsive to the speed of the car, indicates the speed which is thus attained. Should the governor be set for a higher speed than desired the speedometer reading is observed and when the speed desired is reached the button 100 is turned counterclockwise, if the threads on the adjusting screw be right hand threads, to effect a loosening of the governor spring to allow greater movement of the weights and greater action of the governor. This turning of the button is continued or reversed until the desired speed is indicated and becomes constant on the dial. If it is desired to increase the operating speed, the button is oppositely turned to increase the governor spring tension, until the speedometer indicates and maintains such speed indication, control in all cases being entirely by the governor when such speed is reached.

With the car operating under control of the governor it often happens that a car is overtaken moving at very slightly less speed and it is desirable to pass such car, but the length of time consumed, considering the shift speed differences, would render such operation extremely difficult, or even under ordinary traffic conditions, impossible. To overcome this, or if for any other reason speed-up is desired, it is only necessary to depress the accelerator pedal in usual manner and feed temporarily such amount of fuel to the engine as is necessary to accomplish the passing or speeding up, after which the pedal is released and the governor again takes control. In accomplishing this speed-up the accelerator acting through the link 36, shifts the bell crank lever 37—a greater amount than it has been shifted by the pedal feed and through the link 41, bell crank 42, links 44 and lever arm 45, turns the shaft 31 to open the valve 32 wider. Directly, this has little effect, since the valve is perhaps already open wider than is needed, but indirectly the movement rocks the arm 60 and through finger 59 and pin 58 turns shaft 53 and moves the valve 50 towards fully open position allowing full effect of the fuel flow on the engine.

Should it be necessary to slow down from governor speed or to stop, pressure on either the clutch or brake pedal, or both, cuts off fuel flow and brake pedal action in stopping is in no way interfered with.

After slowing down, if car speed is still sufficient, release of brake and clutch pedals restores fuel flow and build-up of car speed as before.

It will be understood that terms such as "vehicle" are used herein for purposes of description and not for limitation, since use of features of the invention with conveyances other than land vehicles is contemplated, as well as for motors and engines in general.

It will be obvious also to those skilled in the art that many modifications and variations may be made in the devices shown in the drawings and described in the specification, all without departing from the spirit of our invention; therefore we do not limit ourselves to what is so shown and described but only as required by the state of the prior art.

We claim:

1. In a vehicle powered by an internal combustion engine having a fuel feed, and valve means adapted to control said fuel feed, said vehicle having an accelerator, clutch and brake pedals, transmission gearing, and shift means for establishing said gearing at option in neutral or operative position; means linking said pedals to said valve means to establish a predetermined fuel flow when said pedals are in non-use positions, with said gear in operative position, said linkage including parts rendering it inoperative when either said pedal is used, means coupled to said shift means cooperating with said linkage to render said linkage inoperative when said gearing is in neutral position, and means connecting said accelerator to said fuel feed to override said predetermined flow.

2. In a vehicle powered by an internal combustion engine having a carbureter, a passageway connecting said carbureter and said engine, and valve means in said passageway adapted to regulate fuel flow from said carbureter to said engine, said vehicle having clutch and brake pedals, transmission gearing, and shift means for establishing said gearing at option in neutral or operative position; means linking said pedals to said valve means to establish fuel flow when said pedals are in non-use positions, with said gears in operative position, said linkage including parts rendering it inoperative when either said pedal is used, and means coupled to said shift means cooperating with said linkage to render said linkage inoperative when said gearing is in neutral position.

3. In a vehicle powered by an internal combustion engine having a fuel feed, and valve means adapted to regulate said fuel feed, said vehicle having clutch and brake pedals, transmission gearing, and shift means for establishing said gearing at option in neutral or operative position; means linking said pedals to said valve means to establish fuel flow when said pedals are in non-use positions, with said gears in operative position, said linkage including parts rendering it inoperative when either said pedal is used, and means coupled to said gear shift means cooperating with said linkage to render said linkage inoperative when said gearing is in neutral position.

4. In a vehicle powered by an internal combustion engine having a carbureter, a passageway connecting said carbureter and said engine, a valve in said passageway adapted to regulate fuel flow from said carbureter to said engine, and means optionally usable for manually operating said valve, said vehicle having clutch and brake pedals, transmission gearing, and shift means for establishing said gearing at option in neutral or operative position; means linking said pedals to said valve to open said valve when said pedals are in non-use positions with said gearing in operative position, said linkage including parts rendering it inoperative when either said pedal is used, and means coupled to said gear shift means cooperating with said linkage to render said linkage inoperative when said gearing is in neutral position.

5. In a vehicle powered by an internal combustion engine having a fuel feed, valve means adapted to control said fuel feed, said vehicle having clutch and brake pedals, transmission gearing, and shift means for establishing said gearing in neutral or operative position; means for linking said pedals to said valve means to establish fuel flow when said pedals are in non-use position and said gears in operative position, said linkage including parts rendering it inoperative when either said pedal is used, means coupled to said gear shift means, cooperating with said linkage to render said linkage inoperative when said gearing is in neutral position; and means responsive to vehicle speed, operatively coupled to said valve means to reduce fuel flow as vehicle speed builds up toward a predetermined maximum.

6. In a vehicle powered by an internal combustion engine having a carbureter, a passageway connecting said carbureter and said engine, and valve means in said passageway adapted to regulate fuel flow from said carbureter to said engine, said vehicle having clutch and brake pedals, transmission gearing, and shift means for establishing said gearing in neutral or operative position; means for linking said pedals to said valve means to establish fuel flow when said pedals are in non-use positions and said gears in operative position, said linkage including parts rendering it inoperative when either said pedal is used, means coupled to said gear shift means, cooperating with said linkage to render said linkage inoperative when said gearing is in neutral position; and means responsive to vehicle speed, operatively coupled to said valve means to reduce fuel flow as vehicle speed builds up toward a predetermined maximum.

7. In a vehicle powered by an internal combustion engine having a carbureter, a passageway connecting said carbureter and said engine, a pair of valves in said passageway adapted to regulate fuel flow from said carbureter to said engine, a first of said valves being biased to close, said vehicle having clutch and brake pedals, transmission gearing, and shift means for establishing said gearing in neutral or operative position; means for linking said pedals to said first valve to establish fuel flow when said pedals are in non-use positions, and said gears in operative position, said linkage including parts rendering it inoperative when either said pedal is used; means coupled to said gear shift means, cooperating with said linkage to render said linkage inoperative when said gearing is in neutral position; and means responsive to vehicle speed operatively coupled to said second valve to move said valve toward closing and reduce fuel flow as vehicle speed builds up toward a predetermined maximum.

8. In a vehicle powered by an internal combustion engine having a carbureter, a passageway connecting said carbureter and said engine, a pair of valves in said passageway adapted to regulate fuel flow from said carbureter to said engine, a first of said valves being biased to close, said vehicle having clutch and brake pedals, transmission gearing, and shift means for establishing said gearing in neutral or operative position; means for linking said pedals to said first valve to establish fuel flow when said pedals are in non-use positions and said gears in operative position, said linkage including parts rendering it inoperative when either said pedal is used; means coupled to said gear shift means, cooperating with said linkage to render said linkage inoperative when said gearing is in neutral position; control means responsive to vehicle speed operatively coupled to said second valve to reduce fuel flow as vehicle speed builds up toward a predetermined maximum, and means for varying the response of said control means relative to said vehicle speed.

9. A speed control for a vehicle having clutch and brake pedals, transmission gearing and means for shifting said gearing into neutral or operative position, and which vehicle is powered by an internal combustion engine having a fuel feed, and means for regulating said feed; means urging said regulating means to cut off fuel flow to said engine, means linking said clutch and brake pedals to said fuel regulating means, and adapted to overcome said cut-off urging means when said pedals are in non-use position, and said gears in operative position, said linkage including parts rendering said linkage inoperative on use of either said pedal, means, actuatable by said gear shift means, cooperating with said linkage, to render said linkage inoperative when said gears are in neutral, and to re-establish operability of said linkage when said gears are shifted into transmission engagement, said control including a mechanism responsive to the speed of the vehicle, and means for coupling said mechanism to said fuel regulating means to reduce fuel feed as the speed of said vehicle increases.

10. A device as in claim 9, including means for varying the response of said control mechanism to said vehicle speed.

11. A speed control for a vehicle having clutch and brake pedals, an accelerator pedal, transmission gearing and means for shifting said gearing into neutral or into operative position, and which vehicle is powered by an internal combustion engine having a fuel feed, and means for regulating said feed; means urging said regulating means to cut-off fuel flow to said engine, means linking said clutch and brake pedals to said fuel regulating means, and adapted to overcome said cut-off urging means when said pedals are in non-use position and said gears in operative position, said linkage including parts rendering said linkage inoperative on use of either said pedal, means actuatable by said gear shift means, cooperating with said linkage, to render said linkage inoperative when said gears are in neutral, and to re-establish operability of said linkage when said gears are shifted into transmission engagement, said control including a mechanism responsive to the speed of the vehicle, means for coupling said mechanism to said fuel regulating means to reduce fuel feed as the speed of said vehicle increases, and linkage connecting said accelerator pedal and said fuel feed regulating means adapted to over-ride all of said fuel cut-off means.

12. A speed control for a vehicle having clutch and brake pedals, an accelerator pedal, transmission gearing, and means for shifting said gearing into neutral or operative position, and which vehicle is powered by an internal combustion engine having a fuel feed, and means for regulating said feed; means urging said regulating means to cut off fuel flow to said engine, means linking said clutch and brake pedals to said fuel regulating means, and adapted to overcome said cut-off urging means when said pedals are in non-use position, said linkage including parts rendering said linkage inoperative on use of either said pedal, means actuatable by said gear shift means, cooperating with said linkage, to render said linkage inoperative when said gears are in neutral, and to re-establish operability of said linkage when said gears are shifted into transmission engagement; said control including a mechanism responsive to the speed of the vehicle, means for coupling said mechanism to said fuel regulating means to reduce fuel feed as the speed of said vehicle increases; means for varying the response of said control mechanism to said vehicle speed, and means connecting said accelerator pedal and said feed regulating means adapted to over-ride all said fuel cut-off means.

13. In a vehicle powered by an internal combustion engine having a carburetor, a passageway connecting said carburetor and said engine, a pair of valves in said passageway adapted to regulate fuel flow from said carburetor to said engine, a first of said valves being biased closed, said vehicle having clutch and brake pedals, an accelerator, transmission gearing, and shift means for establishing said gearing in neutral or operative position; means for linking said pedals to said first valve to establish fuel flow when, with said gears in operative position, said pedals are in non-use positions, said linkage including parts rendering it inoperative when either said pedal is used; means coupled to said gear shift means, cooperating with said linkage to render said linkage inoperative when said gearing is in neutral position; control means, responsive to vehicle speed, operatively coupled to said second valve to reduce fuel flow as vehicle speed builds up toward a predetermined maximum, means for varying the response of said control means relative to said vehicle speed, means coupling said accelerator to said first valve to open said valve, and means linking said first valve to said second valve to override said control means and open said second valve.

14. In a vehicle, powered by an internal combustion engine, having a fuel feed passageway and valve means in said passageway, said vehicle having transmission gears, a gear shift, and brake and clutch pedals; linkage connecting said brake and clutch pedals and said valve means, and adapted to hold said valve means in open position when said gears are in mesh, means movable by said gear shift effective when said shift is in neutral positions to render said linkage ineffective, means operable by actuation of a said pedal for rendering said linkage ineffective; governor means operably connected to a speed responsive part of said vehicle, means for operably coupling said governor to said valve means to effect movement toward closure thereof responsive to increase of vehicle speed, and means for adjusting said governor to vary the rate of valve closure movement.

GEORGE F. WOLFE.
STANLEY G. WETMORE.
HARRY L. McPHERSON.